United States Patent
Rudd et al.

(10) Patent No.: US 6,178,468 B1
(45) Date of Patent: Jan. 23, 2001

(54) REAL TIME SUPPLY PF PLUG-AND-PLAY INSTALLATION RESOURCES

(75) Inventors: Michael L Rudd; Jerlyn R. Culp, both of Fort Collins, CO (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/100,806

(22) Filed: Jun. 19, 1998

(51) Int. Cl.$^7$ ............................. G06F 9/445; G06F 17/30; G06F 15/177; G06F 15/163; G06F 9/06
(52) U.S. Cl. ............................. 710/8; 710/10; 710/15; 710/17; 710/104; 717/11; 709/221; 709/321; 709/222; 707/100
(58) Field of Search ................................. 395/828; 710/8, 710/102, 10, 104, 17, 16; 709/300, 221; 713/2; 711/115; 707/100

(56) References Cited

U.S. PATENT DOCUMENTS

| | | | |
|---|---|---|---|
| 5,146,568 | * 9/1992 | Flaherty et al. | 703/24 |
| 5,261,114 | * 11/1993 | Raasch et al. | 709/221 |
| 5,280,627 | * 1/1994 | Flahety et al. | 713/2 |
| 5,319,751 | * 6/1994 | Garney | 711/115 |
| 5,404,494 | * 4/1995 | Garney | 709/300 |
| 5,412,798 | * 5/1995 | Garney | 713/1 |
| 5,421,009 | * 5/1995 | Platt | 709/221 |
| 5,548,759 | * 8/1996 | Lipe | 707/100 |
| 5,555,416 | * 9/1996 | Owens et al. | 395/712 |
| 5,655,148 | * 8/1997 | Richaman et al. | 710/8 |
| 5,748,980 | * 5/1998 | Lipe et al. | 710/8 |

(List continued on next page.)

OTHER PUBLICATIONS

Kramer, J. "Distributed Software Engineering", Proceedings of the 16th International Conference on Software Engineering, 1994, pp. 253–263.*

Jo, C.–H. et al. "The Distributed Programming Environment on the Internet", Proceedings of the 1999 ACM Symposium on Applied Computing, 1999, pp. 85–90.*

Maginnis, P.T. "Design Considerations for the Transformation of MINIX into a Distributed Operating System", Proceedings, 1988 ACM 16th Annual Conference on Computer Science, 1988, pp. 608–615.*

Hites, B.R. et al. "Technology Magic: Software Distribution at Indiana University", Proceedings of the 25the SIGUCCS Conference on User Services: Are You Ready?, 1997, pp. 127–131.*

* cited by examiner

Primary Examiner—Thomas C. Lee
Assistant Examiner—Katharina Schuster

(57) ABSTRACT

A real time "plug and play" installation mechanism which, instead of signaling the operating system to activate a pre-existing installation file previously shipped with the operating system file structure, energizes the operating system to retrieve the installation from a remote source. Examples of locations from which the installation resources may be retrieved include (1) an internet universal resource location (URL), (2) a dial-up bulletin board service (BBS), (3) a local area network (LAN) or wide area network (WAN) in which any required access protocols are supplied with the new device being installed, or (4) non-volatile storage (e.g. firmware) physically located on the new device being installed. The device manufacturer gives the operating system manufacturer a special installation file at the time that the operating system manufacturer distributes a new release. The special file appears to the operating system to be a conventional installation file. Then, when a new device is installed, the device identifies itself to the operating system, whereupon the operating system's "plug and play" functionality causes the operating system to execute the corresponding special installation file. Instead of receiving installation instructions in the special file, however, the operating system receives instructions to retrieve the installation resources from a selected remote location.

18 Claims, 1 Drawing Sheet

U.S. PATENT DOCUMENTS

| | | | | |
|---|---|---|---|---|
| 5,768,568 | * | 6/1998 | Inui et al. | 710/16 |
| 5,794,032 | * | 8/1998 | Leyda | 713/2 |
| 5,815,731 | * | 9/1998 | Doyle et al. | 710/10 |
| 5,870,610 | * | 2/1999 | Beyda | 395/712 |
| 5,909,545 | * | 6/1999 | Frese, II et al. | 709/208 |
| 5,923,850 | * | 7/1999 | Barroux | 709/224 |
| 5,935,228 | * | 8/1999 | Shinomura | 710/102 |
| 5,974,474 | * | 10/1999 | Furner et al. | 710/8 |
| 6,006,034 | * | 12/1999 | Heath et al. | 717/11 |
| 6,009,274 | * | 12/1999 | Fletcher et al. | 717/11 |
| 6,021,276 | * | 2/2000 | Demke et al. | 717/11 |
| 6,041,183 | * | 3/2000 | Hayafune et al. | 717/11 |
| 6,041,363 | * | 3/2000 | Schaffer | 709/321 |
| 6,080,207 | * | 6/2000 | Kroening et al. | 717/11 |

REAL TIME SUPPLY PF PLUG-AND-PLAY INSTALLATION RESOURCES

TECHNICAL FIELD OF THE INVENTION

This invention relates generally to the installation of devices on computers via "plug and play" functionality in operating systems, and more specifically to enabling a user to use "plug and play" functionality to obtain device installation resources from a remote location at the time a device is installed.

BACKGROUND OF THE INVENTION

Traditional "plug and play" techniques are well known in the art. Generally, an operating system (such as Microsoft Windows) comes already loaded with installation files for many of the devices the user is likely to want to attach to the computer. Then, when a user physically connects a new device to the computer, the device signals the operating system and identifies itself. The operating system then searches its file structure for the corresponding installation file and, if it finds one, runs the installation file so as to install the device automatically with minimal user interaction. If, on the other hand, the operating system cannot find an installation file corresponding to the new device, the operating system typically opens a dialog box with the user, inviting the user to supply an installation file from an external source such as a floppy disk or a CD.

While "plug and play" functionality is an extremely useful and convenient feature, the current state of the art leaves room for improvement in several areas. A first problem is a functional timing problem. Device manufacturers release new devices all the time. Operating system releases tend to be relatively infrequent, however. Thus, it is very difficult, if not impossible, for device manufacturers to anticipate their new product development implementation programs in order to include installation files for those new products in significantly earlier operating system releases.

A further business problem attends the functional timing problem just described. Even if a device manufacturer is physically able to anticipate the release of a new product so as to include an installation file on an earlier operating system release, the device manufacturer may not want to do this. The launch of a new product is often made according to a well-orchestrated pre-launch marketing schedule. The success of the launch is often related to the effectiveness of the pre-launch marketing schedule. It therefore may not be optimal, from a business standpoint, for a device manufacturer to "pre-announce" a new product prematurely by creating an installation file for the new product, just so that an operating system manufacturer can include that installation file in a significantly earlier release of the operating system software.

A further problem with the state of the current art in "plug and play" technology is that it is not flexible to allow device manufacturers to fix bugs or upgrade the firmware in devices after release of the corresponding installation file to the operating system manufacturer. This problem applies whether the device is to be newly released or has been in circulation for some time. The installation file released with the operating system relates to operation of the device at the time that the installation file was given to the operating system manufacturer. It is reasonable to expect that the device manufacturer will fix bugs, enhance, or upgrade the device over time. If the characteristics of the device change over time such that the original installation file given to operating system manufacturers becomes inoperable or obsolete, the advantages of "plug and play" are lost, since the device manufacturer must now ship updated installation files with the corrected, enhanced or updated product.

There is therefore a need in the art to enable device manufacturers to supply installation files to operating systems on more of a real time basis, advantageously according to the needs and conveniences of the device manufacturer, while still taking advantage of existing "plug and play" functionality in operating systems.

SUMMARY OF THE INVENTION

These and other objects, features and technical advantages are achieved by an inventive real time plug and play installation mechanism which, instead of signaling the operating system to activate a pre-existing installation file previously shipped with the operating system file structure, energizes the operating system to retrieve the installation from a remote source. Examples of locations from which the installation resources may be retrieved include (1) an internet universal resource location (URL), (2) a dial-up bulletin board service (BBS), (3) a local area network (LAN) or wide area network (WAN) in which any required access protocols are supplied with the new device being installed, or (4) non-volatile storage (e.g. firmware) physically located on the new device being installed.

It will be appreciated that the foregoing sources are exemplary only, and that the invention is broader in concept in that installation resources may be supplied in accordance with the invention from any remote source accessible to the computer on which the new device is being installed.

The invention becomes enabled by using "plug and play" technology existing in the operating system. Instead of pre-supplying the actual installation resources to the manufacturer of the operating system, the device manufacturer supplies information with which the computer may obtain the corresponding installation resources from a remote source. With reference to the examples described above, such sources may be an internet URL or a BBS location. Alternatively, one of such sources may be non-volatile storage in the new device itself.

To leverage off the "plug and play" functionality in the operating system, the device manufacturer gives the operating system manufacturer a special installation file at the time that the operating system manufacturer distributes a new release. While appearing to the operating system to be a conventional installation file, the special file in fact either contains data identifying a selected remote source, or instructions to retrieve the remote source's identity from "handshaking" signals emitted by the new device being installed. This means that in the Windows 95 operating system, for example, the inventive mechanism would involve pre-supplying Microsoft with special "inf" files. Then, when a new device is installed, the device identifies itself to Windows, which retrieves the corresponding "inf" file. Instead of receiving installation instructions in the file, however, the operating system receives instructions to retrieve the installation resources from the selected remote location.

It is therefore a technical advantage of the present invention to allow device manufacturers to utilize the conveniences of "plug and play" technology, while still making the most recent and up-to-date installation resources available to prospective users. Since according to the invention, the operating system now only requires "directions" to a remote location maintained by the device manufacturer, the device manufacturer now has control of the release and upkeep of installation resources for the device manufacturer's products.

It is a further technical advantage of the present invention not to compel device manufacturers to "pre-announce" forthcoming products by having to place installation resources prematurely in operating systems. Instead, according to the invention, device manufacturers supply operating systems with executable files enabling retrieval of installation resources at a specified remote location preselected by the device manufacturer. The device manufacturer may then release installation resources via the preselected remote location according to the device manufacturer's own priorities and schedule.

A still further technical advantage of the present invention is that the device manufacturer is now also able to make upgrades and other improvements available to existing customers via the inventive mechanism. If a customer with currently-installed device learns of, for example, a firmware upgrade, she may retrieve the upgrade simply by re-installing the device on her computer. The operating system's "plug and play" functionality will activate the "file installation" procedures again, causing the operating system to select and retrieve the installation file corresponding to the device in question. Instead of finding installation resources in the location installation file, the operating system finds, according to the invention, source information from which it may retrieve the installation resources. The installation file then energizes the operating system to retrieve these installation resources from the specified remote location. Rather than installation resources, however, the device manufacturer will have now placed the upgrade desired by the user at this remote location. The user thus uses the "plug and play" functionality to automatically retrieve and install the upgrade.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
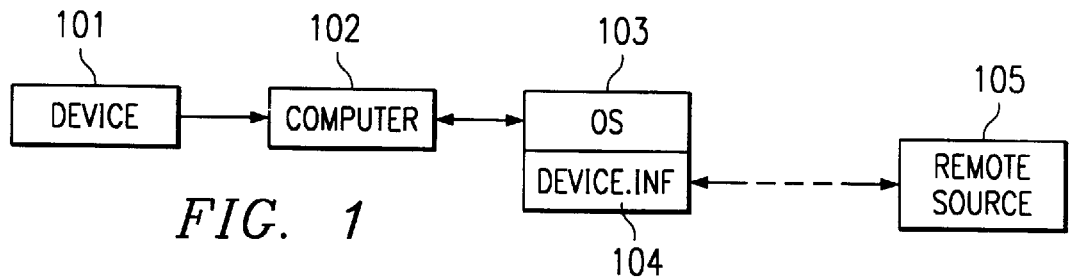
FIG. 1 is a functional block diagram depicting structure embodying the present invention.

FIG. 1 is a functional block diagram of a user installing a new device 101 on a computer 102 having operating system 103. In FIG. 1, operating system 103 is, for the purposes of example, Microsoft Windows 95, although it will be appreciated that the present invention may be implemented with equivalent enabling effect in conjunction with any operating system having "plug and play" functionality. In accordance with the present invention, the manufacturer of device 101 has previously supplied the manufacturer of operating system 103 with an installation file 104, labeled on FIG. 1 as "DEVICE.INF" to be consistent with the exemplary use of Windows 95.

It will be understood on FIG. 1 that consistent with "plug and play" functionality standard in the art, operating system 103 will execute installation file 104 when corresponding device 101 is presented for installation. Under the present invention, however, as further shown on FIG. 1, installation file 104 contains instructions to retrieve installation resources from remote site 105. This is in distinction to the current art, where installation file 104 would be expected to contain the installation resources themselves.

Figure 2:
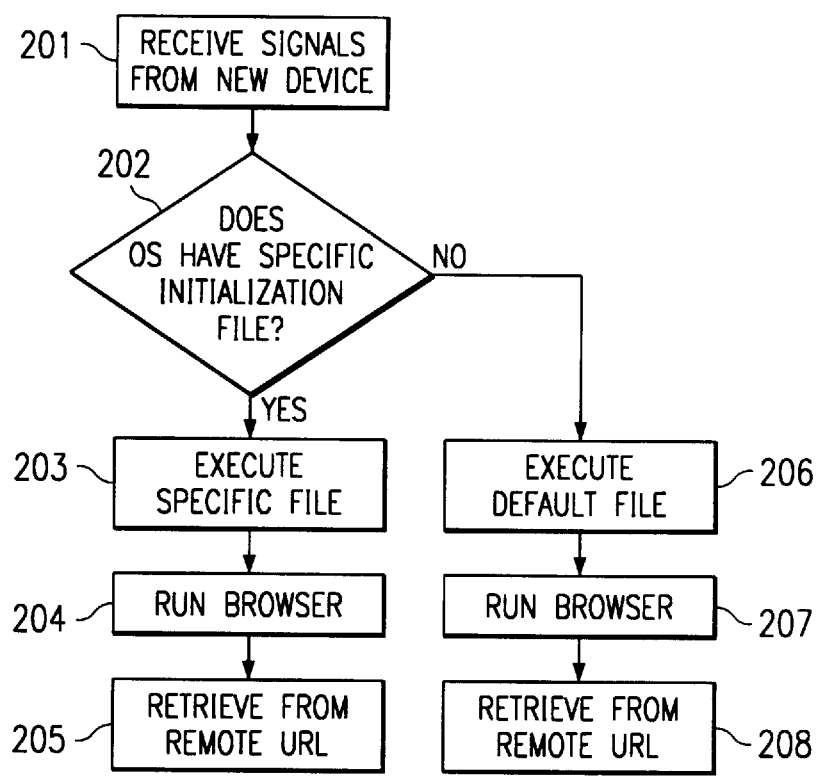
FIG. 2 is a flow diagram illustrating logic embodying the present invention.

Turning to FIG. 2, exemplary logic is illustrated by which installation resources may be received remotely according to the structure disclosed in reference to FIG. 1. In the example of FIG. 2, installation resources are retrieved remotely over the internet. Alternative non-internet retrievals will be described later, and will be understood to be logically equivalent to the disclosure of FIG. 2 in accordance with present invention.

In FIG. 2, according to conventional "plug and play" functionality, a new device emits "handshaking" signals when installed so that the receiving computer can recognize the device and execute a corresponding installation file (block 201). According to the invention in broad form, when that corresponding installation file is executed (blocks 203, 206), it causes a browser application already resident on the operating system to energize (blocks 204, 207) and retrieve installation resources from an internet universal resource location ("URL") specified either in the installation file or in the device handshake signals (blocks 205, 208).

A further optional feature of the invention is illustrated in FIG. 2. In some cases, the device manufacturer may have had the opportunity to pre-supply the operating system manufacturer with an installation file that is specific to the device being installed. In such a case, the device's handshake signals will cause the operating system to execute a corresponding installation file as described above (blocks 203, 204, 205). However, if the device is one that is unfamiliar to the operating system, block 202 in FIG. 2 illustrates that the new device's handshake signals cause the operating system to execute a "default" installation file (block 206) that was pre-supplied by the device manufacturer to be included in the prior most recent operating system release. As before, this default file again energizes a resident browser application to retrieve installation resources from a remote URL specified in either default file or the handshake (blocks 207, 208). In the "default" case, however, the remote URL will have the capability to selectively supply the installation resources corresponding to the particular new device that has triggered the default installation file.

This optional "default" feature as illustrated on FIG. 2 enables device manufacturers not to have to "pre-announce" new products prematurely in order to get installation files into the hands of operating system manufacturers. The advantages of avoiding "pre-announcement" are discussed above in the previous section.

It will be appreciated that consistent with the scope of the present invention, other alternative remote sources may be used from which to retrieve installation resources. The structure and logic in FIGS. 1 and 2 remains substantially the same for these alternatives, however. For example, instead of running a browser for internet URL retrieval, the installation file could cause resident communications software to dial up a remote bulletin board service ("BBS") and retrieve the installation resources from there. Again, the required information, including access protocols (such as passwords) could be either in the installation file or the new device's handshaking signals. Alternatively, the remote source could be a local area network (LAN) or wide area network (WAN).

In another embodiment, the installation resources are resident in firmware on the new device itself. In this case, therefore, the remote source is the device itself.

It will be further appreciated that the invention is not limited to first-time installation of new devices. As described in the previous section, the invention can also serve to bring corrected, enhanced or updated installation resources to devices already installed on the user's computer. The user merely has to re-install the device in accordance with the invention to obtain the revised installation resources.

Although the present invention and its advantages have been described in detail, it should be understood that various changes, substitutions and alterations can be made herein without departing from the spirit and scope of the invention as defined by the appended claims.

We claim:

1. A method for providing installation resources for a device to be installed on a computer, the computer having an operating system providing plug-and-play functionality, the method comprising:

creating an installation file for the device, the installation file executable by said plug-and-play finctionality in the operating system, the installation file, when executed instructs the operating system to retrieve installation resources for the device from a preselected location, the preselected location being remote from the computer;

placing the installation file in residence on the operating system; and disposing the device to emit handshaking signals upon installation on the computer, the handshaking signals in turn prompting said plug-and-play functionality to execute the installation file.

2. The method of claim 1, in which the preselected location is selected from the group consisting of:

an internet universal resource location (URL);
a bulletin board service (BBS);
a local area network (LAN);
a wide area network (WAN); and
non-volatile storage in the device.

3. The method of claim 1, in which the installation file specifically corresponds to the device, and in which the device is recognized by the operating system as specifically corresponding to the installation file.

4. The method of claim 1, in which the installation file is a default installation file executed by said plug-and-play functionality when the device is not recognized by the operating system.

5. The method of claim 1, in which the handshaking signals identify the preselected location to the operating system.

6. The method of claim 1, in which the installation file identifies the preselected location to the operating system.

7. The method of claim 1, in which the operating system is a Microsoft operating system, and in which the installation file is an ".inf" file type.

8. The method of claim 1, further comprising:

following initial installation of the device on the computer, subsequently retrieving revised installation resources for the device from the preselected location by reinstalling the device.

9. A method for providing installation resources for a device to be installed on a computer, the computer having an operating system providing plug-and-play functionality, the method comprising:

creating an installation file for the device, the installation file executable by said plug-and-play functionality in the operating system, the installation file, when executed instructs the operating system to retrieve installation resources for the device from a preselected location, the preselected location being remote from the computer, the preselected location selected from the group consisting of:

an internet universal resource location (URL);
a bulletin board service (BBS);
a local area network (LAN);
a wide area network (WAN); and
non-volatile storage in the device;

placing the installation file in residence on the operating system; and disposing the device to emit handshaking signals upon installation on the computer, the handshaking signals in turn prompting said plug-and-play functionality to execute the installation file, said execution of the installation file causing the preselected location to be identified to the operating system by either the handshaking signals or the installation file.

10. The method of claim 9, in which the installation file specifically corresponds to the device, and in which the device is recognized by the operating system as specifically corresponding to the installation file.

11. The method of claim 9, in which the installation file is a default installation file executed by said plug-and-play functionality when the device is not recognized by the operating system.

12. The method of claim 9, in which the operating system is a Microsoft operating system and in which the installation file is an ".inf" file type.

13. The method of claim 9, further comprising:

following initial installation of the device on the computer, subsequently retrieving revised installation resources for the device from the preselected location by reinstalling the device.

14. A method for providing installation resources for a device to be installed on a computer, the computer having an operating system providing plug-and-play functionality, the method comprising:

creating an installation file for the device, the installation file executable by said plug-and-play functionality in the operating system, the installation file when executed instructing the operating system to retrieve installation resources for the device from a preselected location, the preselected location being remote from the computer;

placing the installation file in residence on the operating system;

disposing the device to emit handshaking signals upon installation on the computer, the handshaking signals in turn prompting said plug-and-play functionality to execute the installation file, said execution of the installation file causing the preselected cation to be identified to the operating system by either the handshaking signals or the installation file; and following initial installation of the device on the computer, subsequently retrieving revised installation resources for the device from the preselected location by reinstalling the device.

15. The method of claim 14, in which the preselected location is selected from the group consisting of:

an internet universal resource location (URL);

a bulletin board service (BBS);

a local area network (LAN);

a wide area network (WAN); and non-volatile storage in the device.

16. The method of claim 14, in which the installation file specifically corresponds to the device, and in which the device is recognized by the operating system as specifically corresponding to the installation file.

17. The method of claim 14, in which the installation file is a default installation file executed by said plug-and-play functionality when the device is not recognized by the operating system.

18. The method of claim 14, in which the operating system is a Microsoft operating system and in which the installation file is an ".inf" file type.

* * * * *

UNITED STATES PATENT AND TRADEMARK OFFICE
CERTIFICATE OF CORRECTION

PATENT NO. : 6,178,468 B1
DATED : January 23, 2001
INVENTOR(S) : Michael L. Rudd et al.

It is certified that error appears in the above-identified patent and that said Letters Patent is hereby corrected as shown below:

<u>Title page, Item [54] and Column 1, line 1,</u>
Title, delete "PF" and insert therefor -- OF --

<u>Column 6,</u>
Line 65, delete "cation" and insert therefor -- location --

Signed and Sealed this

Twelfth Day of November, 2002

*Attest:*

*Attesting Officer*

JAMES E. ROGAN
*Director of the United States Patent and Trademark Office*